United States Patent
Zoppas et al.

(10) Patent No.: US 10,758,865 B2
(45) Date of Patent: Sep. 1, 2020

(54) DEVICE AND METHOD FOR PURIFYING EXHAUST GAS FROM ENDOTHERMIC ENGINES

(71) Applicant: I.R.C.A. S.P.A. INDUSTRIA RESISTENZE CORAZZATE E AFFINI, San Vendemiano (IT)

(72) Inventors: Federico Zoppas, Treviso (IT); Bruno Savi, Belluno (IT)

(*) Notice: Subject to any disclaimer, the term of this patent is extended or adjusted under 35 U.S.C. 154(b) by 0 days.

(21) Appl. No.: 15/770,377

(22) PCT Filed: Oct. 24, 2016

(86) PCT No.: PCT/IB2016/056379
§ 371 (c)(1),
(2) Date: Apr. 23, 2018

(87) PCT Pub. No.: WO2017/068557
PCT Pub. Date: Apr. 27, 2017

(65) Prior Publication Data
US 2018/0311615 A1 Nov. 1, 2018

(30) Foreign Application Priority Data
Oct. 23, 2015 (IT) .................. 102015000064740

(51) Int. Cl.
*B01D 53/92* (2006.01)
*B01D 53/26* (2006.01)
(Continued)

(52) U.S. Cl.
CPC .......... *B01D 53/92* (2013.01); *B01D 47/021* (2013.01); *B01D 53/007* (2013.01);
(Continued)

(58) Field of Classification Search
CPC .... B01D 53/92; B01D 53/007; B01D 47/021; B01D 53/265; B01D 53/323;
(Continued)

(56) References Cited

U.S. PATENT DOCUMENTS

| 3,236,045 A | * | 2/1966 | Berger | ............ F01N 3/00 55/400 |
| 3,304,711 A | * | 2/1967 | Eastman | ............ F01N 3/00 55/338 |

(Continued)

FOREIGN PATENT DOCUMENTS

| DE | 202014002419 U1 | 4/2014 |
| EP | 2862619 A1 | 4/2015 |

(Continued)

OTHER PUBLICATIONS

International Search Report for PCT/IB2016/056379 dated Feb. 14, 2017.

*Primary Examiner* — Nicholas A Smith
*Assistant Examiner* — Colleen M Raphael
(74) *Attorney, Agent, or Firm* — Abelman, Frayne & Schwab; Stefan Knirr

(57) ABSTRACT

An exhaust gas purification device of an internal combustion engine. The device comprises a cylindrical container where the exhaust gas is separated from the water vapor and purified from solid suspensions, and a cell where the purified exhaust gas is converted into oxygen once it has been disassociated by bombarding with ultraviolet rays. The oxygen thus recovered can be re-introduced into the atmosphere or reused for the combustion process.

7 Claims, 6 Drawing Sheets

(51) Int. Cl.
    *B01D 53/32*     (2006.01)
    *B01D 47/02*     (2006.01)
    *B01D 53/00*     (2006.01)

(52) U.S. Cl.
    CPC ......... *B01D 53/265* (2013.01); *B01D 53/323* (2013.01); *B01D 2256/12* (2013.01); *B01D 2257/504* (2013.01); *B01D 2257/80* (2013.01); *B01D 2258/012* (2013.01); *B01D 2259/804* (2013.01); *Y02C 20/20* (2013.01)

(58) Field of Classification Search
    CPC ........ B01D 2259/804; B01D 2258/012; B01D 2257/504; B01D 2256/12; B01D 2257/80; Y02C 20/20
    USPC ......... 422/24, 186–187; 204/157.15, 157.44, 204/157.63
See application file for complete search history.

(56) References Cited

U.S. PATENT DOCUMENTS

| | | | |
|---|---|---|---|
| 5,714,665 A | 2/1998 | Ohtake et al. | |
| 6,168,689 B1* | 1/2001 | Park | B01D 53/323 |
| | | | 204/164 |
| 2007/0231233 A1* | 10/2007 | Bose | B01D 53/24 |
| | | | 423/245.1 |
| 2012/0093691 A1* | 4/2012 | Mole | A61L 2/14 |
| | | | 422/121 |
| 2015/0360177 A1* | 12/2015 | Tsumagari | B01D 53/9431 |
| | | | 204/242 |

FOREIGN PATENT DOCUMENTS

| | | |
|---|---|---|
| FR | 2495492 A1 | 6/1982 |
| WO | 2007107544 A2 | 9/2007 |

\* cited by examiner

DEVICE AND METHOD FOR PURIFYING EXHAUST GAS FROM ENDOTHERMIC ENGINES

RELATED APPLICATIONS

This application is a national phase of International Application No. PCT/IB2016/056379 filed Oct. 24, 2016, and claims priority from Italian Patent Application No. 102015000064740 filed Oct. 23, 2015, both incorporated by reference in theft entirety.

FIELD OF THE INVENTION

The present invention relates to a device for purifying exhaust gas produced by automotive engines during the combustion process of fuels, such as gasoline or methane.

BACKGROUND ART

The exhaust gas produced by the combustion of fossil fuels in car engines create ecological problems because they are released into the atmosphere of populated environments and the inhabitants breathe them, particularly in major cities, in industrial zones, tunnels, garages, etc. One of the major polluting agents is aqueous vapor mixed with carbon dioxide, which together with fine particulate matter may cause smog. Condensation methods are normally employed to eliminate the aqueous vapor by cooling the exhaust gas to the dew point of the aqueous vapor. Furthermore, said exhaust gas layer in the troposphere, thus causing an increase of the greenhouse effect. The increase of greenhouse gas concentration, caused by human activities, is leading to a global warming of the Earth, causing dangerous climate changes. Various systems for abating atmospheric emissions currently exist:

Thermal molecular dissociation, which is a high energy intensity process

Chemical molecular dissociation, with implications related to disposal

Gas discharge dissociation, with very low energy efficiencies

Hydrolysis reactions requiring frequent replacement of the concerned waste reactants Mechanical, electrostatic and UV filters having poor efficiency on large aeriform masses.

The carbon dioxide emissions cannot be eliminated with catalyzed chemical reactions or filters operating in the exhaust system, while their amount depends on fuel consumption, i.e. a motor vehicle with double fuel consumption will release a double quantity, which is normally evaluated in terms of grams per kilometer. For example, a car with a small displacement engine may release about 100 g/km, while a car with an engine with displacement higher than 1500 cc releases over 250 g/km. Recent European Standards establish that cars made after 2015 must release an amount of $CO_2$ not higher than 130 g/km, which value must be reduced to 95 g/km for cars made after 2020. Not all manufacturers adopt similar technical solutions; indeed, others suggest to automatically stop the engine while standing or to make small displacement engines with use of electric compressor or to obtain braking controlled by electric generators or even hybrid engines, i.e. combined with an electric motor. "Carbon sequestration", which includes storing the $CO_2$ underground, is the main technology on which investments are being made in Europe. However, there are considerable doubts concerning its environmental sustainability, in terms of possible geological unbalance and stability over time. The need is apparent to have new technologies which can either eliminate or reduce the introduction of greenhouse gases resulting from combustion into the atmosphere.

The need is thus felt to overcome the disadvantages of the prior art.

SUMMARY OF THE INVENTION

It is an object of the present invention to reduce the greenhouse effect gases released by an internal combustion engine.

The present invention provides a filtering method operating a reduction of the greenhouse effect gases released by an internal combustion engine, said method being based on the disassociation of the composite molecules present in the burnt gas.

Said method is implemented by means of a device, according to claim 1, for purifying the exhaust gas of an internal combination engine, comprising:

a) a vapor separation module, where water vapor and solid particles are stripped from said exhaust gas, comprising a cylindrical container with vertical rotation axis and having a lower part and an upper part, said module having an inlet for introducing exhaust gas located in the lower part and provided with a fluid-tight valve, a cover which closes the upper end of said cylindrical container, an outlet being located on said cover for the exhaust gas treated in said vapor separation module;

b) an intake module, comprising a radial blade fan with vertical rotation axis for aspirating the exhaust gas through an inlet connected to said outlet of the cylindrical container and provided with an outlet for expelling the aspirated gases;

c) a module consisting of a photodissociation cell, in which the exhaust gas, dried and free from solid suspensions, is subjected to a photodissociation process, by means of which the carbon dioxide contained in said gas is split into its components, said photodissociation cell being provided with an opening for introducing the exhaust gas connected to the outlet of said intake module and with an opening for releasing the gas resulting from the photodissociation.

A second aspect of the present invention provides a method for purifying the exhaust gas released by an internal combustion engine provided with a device according to claim 1, such a method comprising the following steps:

a) introducing exhaust gases into the vapor separation module, b) separating the aqueous vapor contained in the exhaust gas by means of condensation, b) eliminating the corpuscular residue present in the exhaust gas by filtering, c) aspirating the dried exhaust gas which is free from corpuscular impurities and introducing said gas into a gas molecular dissociation cell for treating it with ultraviolet rays.

The device according to the invention allows to purify the exhaust gases of the internal combustion engine and to convert them into breathable air. The advantageous effects of the invention are obtained, in particular, by virtue of the coupling of the separation module to the module comprising the photodissociation cell. Another advantageous aspect is that the device of the invention is small in size. Advantageously, the ultraviolet rays are produced in the photodissociation cell by applying a unidirectional pulsating electric field of high intensity but insufficient to produce a discharge in the exhaust gas. Advantageously, the exhaust gas purified by means of the described device is re-introduced into the engine to be used again in the combination process, thus increasing engine efficiency.

The dependent claims describe preferred embodiments of the invention.

BRIEF DESCRIPTION OF THE DRAWINGS

Further features and advantages of the invention will become more apparent in light of the detailed description of a preferred, but not exclusive, embodiment of an exhaust gas purification system shown by way of non-limitative example, with reference to the accompanying drawings, in which.

The same reference numbers and letters in the figures refer to the same elements or components.

DETAILED DESCRIPTION OF A PREFERRED EMBODIMENT OF THE INVENTION

Figure 1:
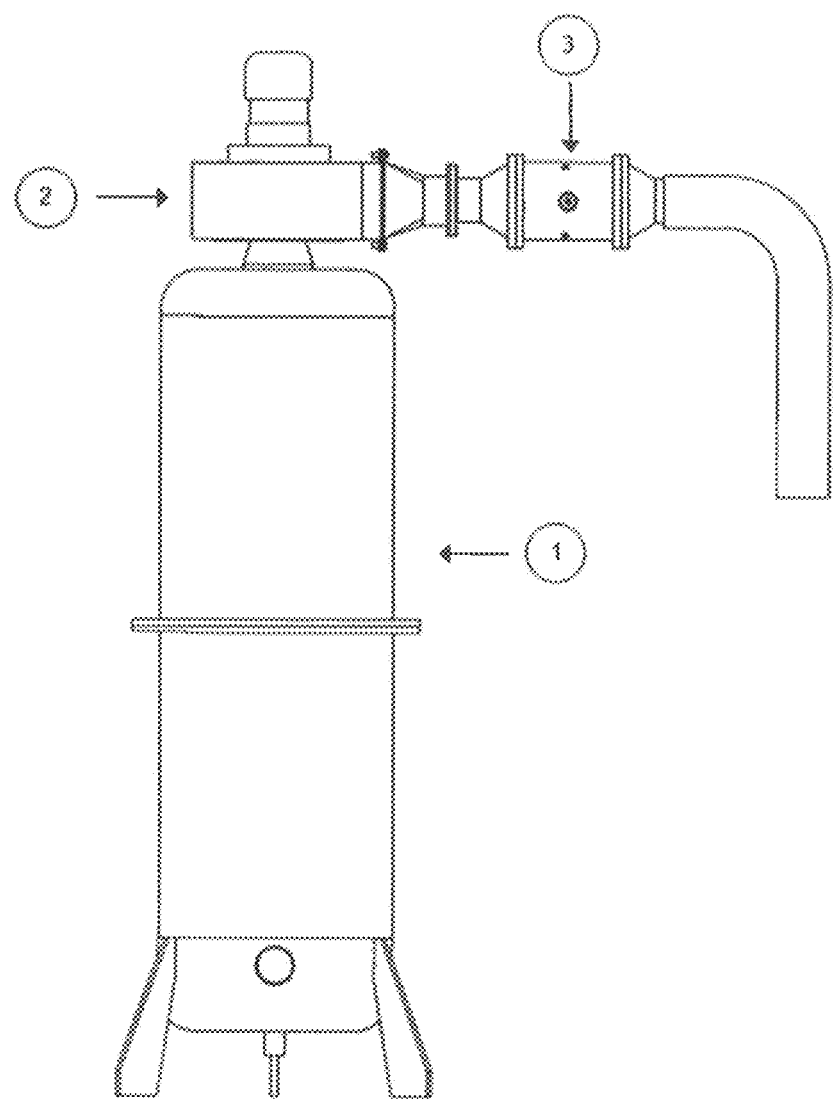
FIG. 1 shows an overview of the gas treatment system object of the invention.

The invention generally provides an exhaust gas purification device 100 of an internal combustion engine, comprising:
a) a vapor separation module, comprising
  a cylindrical container 1 with vertical rotation axis and having a lower part and an upper part, said separation module having an inlet 4 for introducing exhaust gas located in the lower part and provided with a fluid-tight valve,
  a cover which closes the upper end of said cylindrical container 1, an outlet 9 being located on said cover for the exhaust gas treated in said vapor separation module;
  separation means for retaining water vapor and solid particles from the exhaust gas,
whereby the separation module is configured to remove water vapor and solid particles from said exhaust gas, thus obtaining dried gas which is dried and free from solid suspensions,
b) an intake module 2 comprising
an inlet 16 connected to the outlet 9 of the separation module,
a radial blade fan with vertical rotation axis,
an outlet 19,
the intake module 2 being configured to aspirate the dried gas through inlet 16 and to expel it through outlet 19;
c) a module 3 consisting of a photodissociation cell,
said photodissociation cell being provided with an opening 10 connected to the outlet 19 of said intake module 2 for introducing the dried gas and an opening 15 for releasing the gas resulting from the photodissociation,
the photodissociation cell comprising
a first electrode 11 which acts as an anode, formed by a plurality of filiform antennas,
a second electrode, consisting of the wall of the photodissociation cell,
a pulse generator connected to the first electrode and to the second electrode,
the photodissociation cell being configured to generate ultraviolet rays by applying a unidirectional pulsating electric field by means of the pulse generator to the first electrode and the second electrode,
whereby the dried gas is subjected in the dissociation module 3 to a photodissociation process by means of which the carbon dioxide contained in said dried gas is broken down into its components.

Furthermore, the invention generally provides a method for purifying the exhaust gas released by an internal combustion engine provided with a device according to the preceding claims, such a method comprising the following steps:
a) introducing exhaust gases into the vapor separation module,
b) separating the aqueous vapor contained in the exhaust gas by means of condensation,
b) eliminating the corpuscular residue present in the exhaust gas by using said separation means,
c) aspirating the dried exhaust gas which is free from corpuscular impurities and introducing said gas into a gas molecular dissociation cell for treating it with ultraviolet rays.

Figure 2:
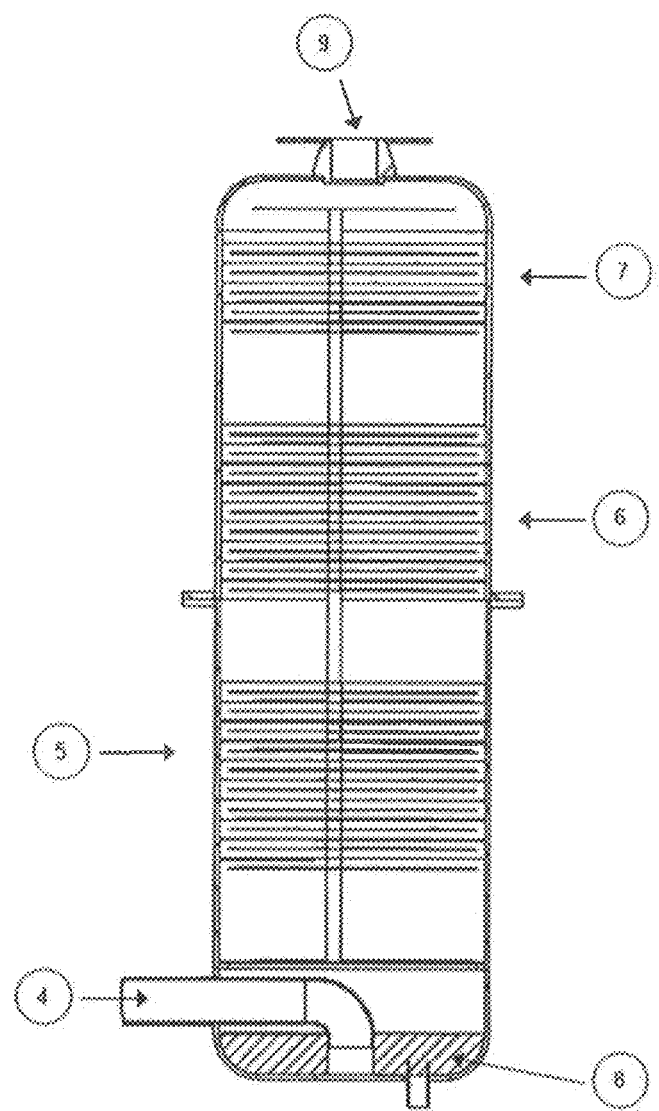
FIG. 2 shows a section of a detail of the vapor separation module of the invention.
Figure 5:
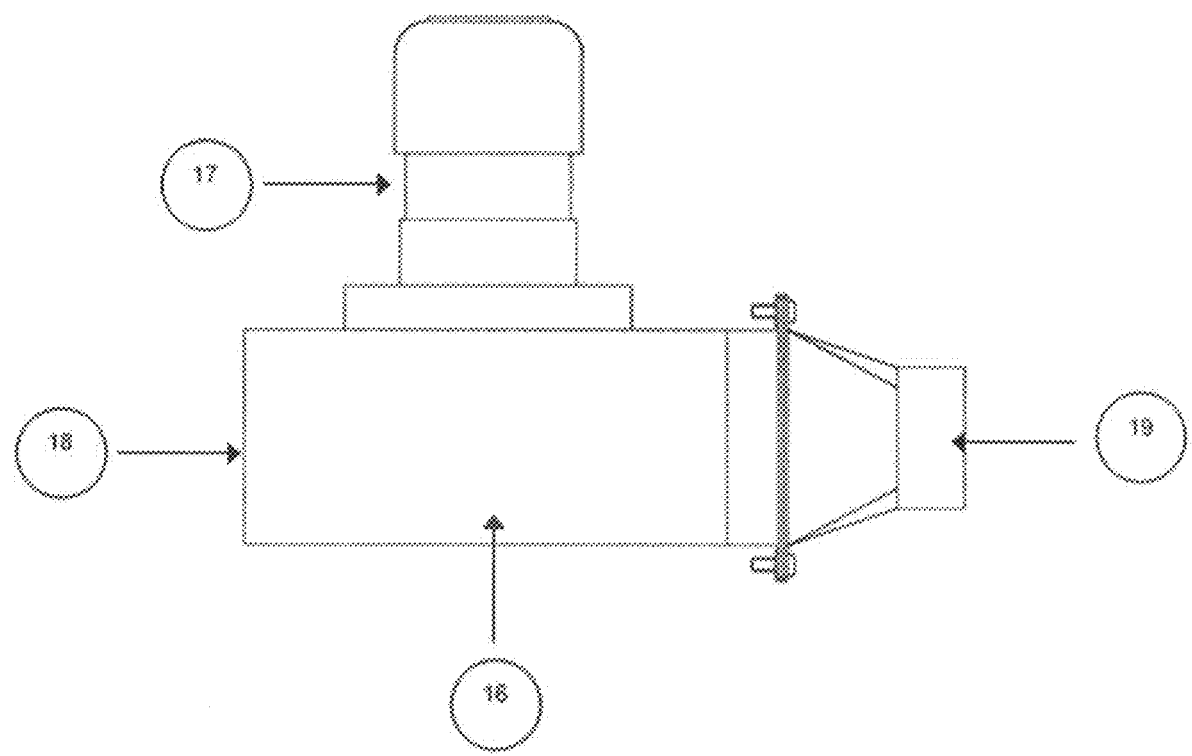
FIG. 5 is a side view of the intake module of the invention.

An exhaust gas treatment system according to the present invention is shown in FIG. 1. Said system comprises a module 1 for separating the vapor from the exhaust gas, a module 2 for aspirating the gas treated in module 1 and for introducing said gas into module 3 where the gas molecular dissociation occurs. The vapor separating module 1 comprises a cylindrical container having a vertical axis and arranged in the lower part of the treatment system, as shown in FIG. 1. According to a preferred embodiment, the vapor separation module 1, described in greater detail with reference to FIG. 2, is provided with an exhaust gas inlet 4 located at the base of the cylindrical container. Inlet 4 is connected to the engine outlet gas delivery. Module 1 comprises an outlet 9 for the treated gases located in the upper part of the cylindrical container; through this outlet 9, module 1 is connected to the next intake module 2 (FIG. 5) by means of a coupling joint, preferably of the ISO-KF or equivalent type, at section 16. Module 2 is, in turn, connected to the next module 3, photodissociation cell, (FIG. 3) by means of a coupling joint, preferably of the ISO-KF or equivalent type, at sections 19 and 15. The exhaust gas containing carbon dioxide and water in vapor state flows from the exhaust of the internal combustion engine through the inlet pipe 4 into the separation module 1 where it passes through a cooling fluid 8. The aqueous vapor undergoes a condensation process in the cylindrical container. Once entered, the gases cross the volume of liquid 8 present in the lower part of the cylindrical container by bubbling, thus releasing any particles present in suspension in the gas.

The gas then sequentially crosses a series of partitions 5, 6, and 7 to reach the upper part of the cylindrical container. During this step, the cooled gas, by coming into contact with the surface of the partitions 5, 6, 7, surrenders the drops of humidity present therein due to interference, which drops are deposited on the metal surface of the partitions themselves.

The gas, now mostly consisting of carbon dioxide without aqueous vapor or particles, thus reaches the top of the cylindrical container, exiting definitively from module 1 at section 9. The vapor separation treatment operated within module 1 ensures that the exhaust gas released from section 9 is under perfect electric insulating conditions.

The treated gas thus enters into the intake module 2 (FIG. 5) at section 16. Such a module comprises a radial centrifuge aspirator, and in particular comprises a self-ventilated electric motor 17, coupled to a blade impeller, and a cochlea 18. Such an intake module 2 is used to compensate for the loss of load introduced by the vapor separating module 1 in order to keep the gas flow uniform at the photodissociation cell 3 inlet.

The gas exits definitely from module 2 at the tangential section 19.

Figure 3:
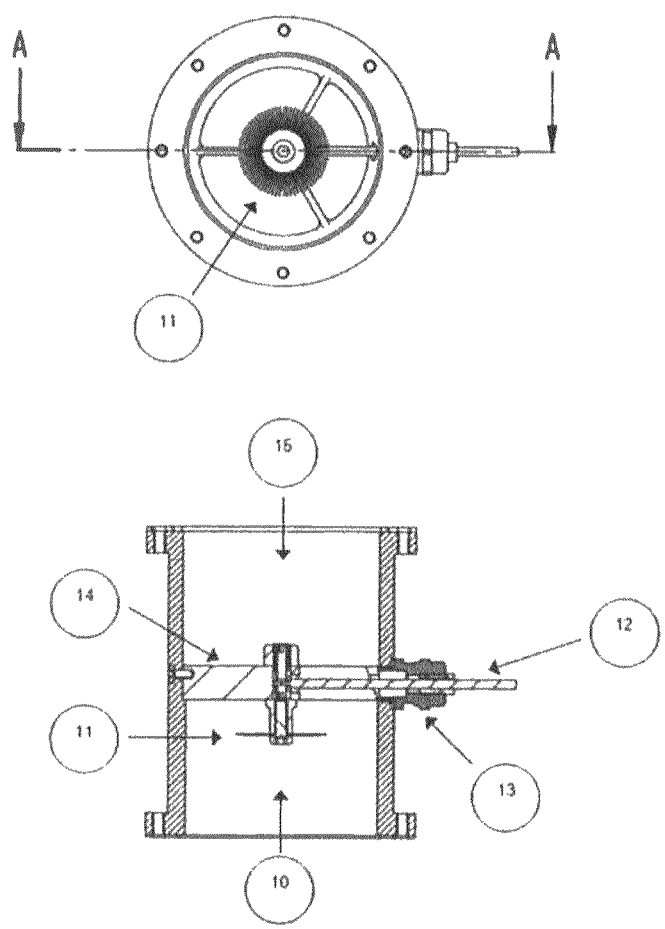
FIG. 3 shows a section view of a detail of the photodissociation cell module of the invention.
Figure 4:
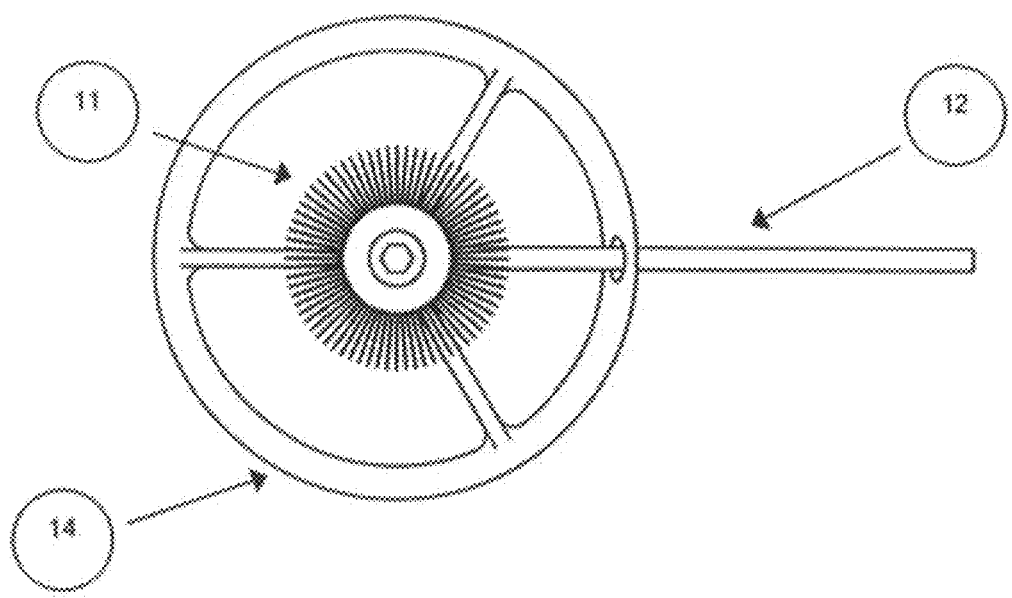
FIG. 4 shows a front view of the emitter anode related to the photodissociation cell module.

The gas thus enters into the photodissociation cell 3 at section 10 (FIG. 3). A unidirectional pulsating electric field is applied in this module 3 between anode 11 and cathode, the cylindrical walls of cell 3 being the cathode. In the aforesaid cell, the carbon dioxide is eliminated by means of a molecular dissociation process, thus recovering the oxygen lost with the combustion. The gas to be treated, being free from liquid or solid suspensions, is subjected to bombarding with ultraviolet rays, thus simultaneously eliminating the carbon. The gas to be treated is introduced into cell 6 through inlet 10 (FIG. 3), where it is subjected to the flow of ultraviolet rays for emerging after the treatment through the second opening 15. The electric field is applied by connecting the phase of the pulse generator to the power supply wire 12, which, by crossing insulator 14, is in turn electrically connected to the anode 11 formed by a plurality of filiform antennas (FIG. 4). The neutral of the pulse generator, or cathode, is integrally connected to the metal structure of the photodissociation cell.

The unidirectional pulsating electric field causes the electrons to oscillate on the tips of anode 11. The ultraviolet radiation is produced by the oscillations of the clouds of electrons which are formed on the tips of the filiform antennas, which form the anode 11 of the cell, in the presence of a uniform pulsated electric field of high intensity but of a value lower than that required to form a discharge in the gas. The ultraviolet radiation causes the dissociation of the carbon dioxide molecule into two negative oxygen ions and into one positive carbon ion. The carbon ion attracted by the walls of cell 6 will form a weak current, thus closing the electric circuit. The oxygen ions are pushed out of cell 6 where they Will form oxygen molecules.

The treated gas exits definitely from module 3 at section 15.

Figure 6:
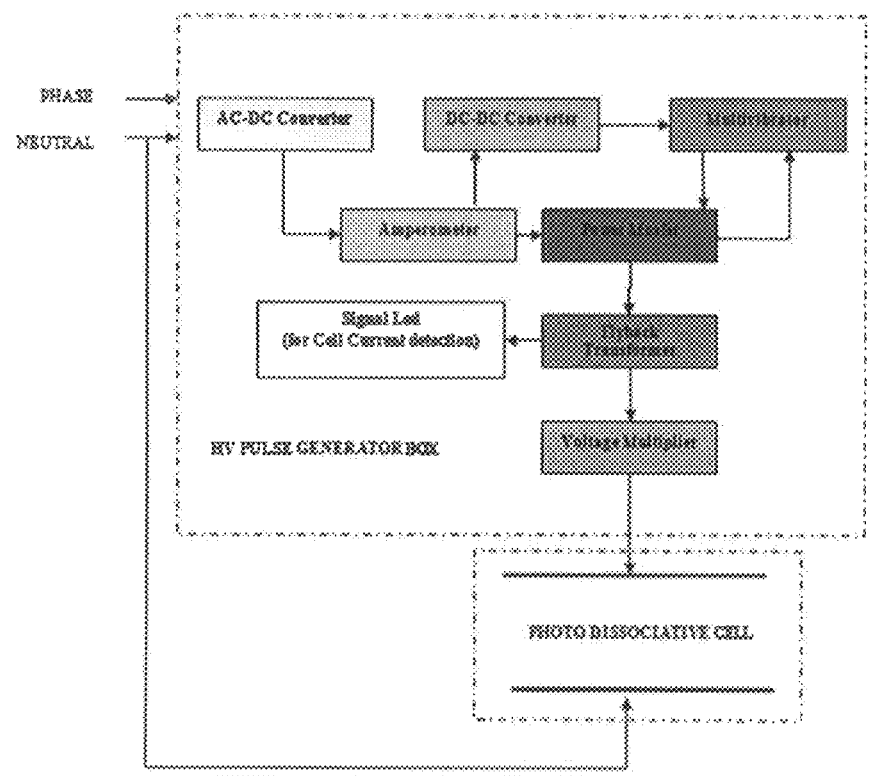
FIG. 6 is a block chart of the pulse generator of the invention.

FIG. 6 shows a block chart of the pulse generator which supplies the photodissociation cell. The pulse generator consists of seven distinct modules:

1) AC-DC Converter:

Insulated AC-DC power supply (by means of a transformer) with output voltage adjustable by means of a trimmer (range ~10-16 Vdc), Output power available ~4.5 W.

2) DC-DC Converter:

8V output voltage adjuster for supplying the Multivibrator.

3) Multivibrator:

Block used to generate a periodic low-voltage square-wave signal with frequency ~15.8 Khz to drive the power MOSFET.

4) Power MOSFET:

Power switch driven by the signal generated by the Multivibrator. The power signal is supplied directly by the AC-DC power supply out.

5) Flyback Transformer (EAT):

Voltage elevator which elevates the output voltage from the power MOSFET to 8 kV.

6) Voltage Multiplier:

Voltage tripler which multiplies by three the output voltage from the Flyback Transformer. The output signal from the voltage multiplier goes directly to the anode 11 of the photodissociation cell, whilst the cathode is connected to ground. The AC-DC Converter transforms the non-stabilized 220V-50 Hz mains alternating voltage, which is sent to the stabilized voltage regulator (DC-DC Converter) and to the drain of the power MOSFET in common source configuration.

The direct voltage output of the DC-DC Converter stabilized at 8 V is used to supply the Multivibrator (integrated NE 555), which generates a pulse train with frequency of 15.8 kHz which drives the power MOSFET gate.

The power MOSFET outputs a pulse train with 0-12 VDC voltage levels with the same frequency equal to 15.8 kHz.

The power MOSFET is connected to the primary of the Flyback Transformer (EAT) which supplies the high voltage level of the 8 kV pulse train to its secondary. Therefore, downstream of the Flyback Transformer (EAT), the voltage level is a 0-8 kV pulse train with frequency of 15.8 kHz.

In turn, the output of the secondary Flyback Transformer (EAT) is connected to the Voltage Multiplier input which triplicates the high voltage level of the pulse train taking it to 0-24 kV with the same frequency of 15.8 kHz. The output of the Voltage Multiplier at 0-24 kV 15.8 kHz is supplied to the cell anode.

In order to detect the current which supplies the anode of the cell, an analog ammeter is inserted in series between the 12V output of the AC DC Converter and the power MOSFET drain.

For the same purpose, a LED is inserted with the resistance thereof in series having one of the two ends connected to a conductor wire wound about the ferrite of the Flyback Transformer (EAT). In such a circuitry configuration, the LED is supplied by the current generated by electromagnetic induction by the current passing and crossing the secondary of the Flyback Transformer (EAT), thus providing visual feedback to the current directed to the anode of the cell.

The circuit diagram above also allows the linear adjustment of the high value of the pulse power supply voltage of the cell anode. The adjustment is allowed by acting on the AC DC Converter to vary the output voltage in a range from 10V to 16V DC.

The device according to the invention allows to purify the exhaust gases of the internal combustion engine and to convert them into oxygen, which may be used again for combustion or can be re-introduced into the atmosphere. The device is actually usable in all thermal system types based on the combustion of fossil fuels. Important advantages of the system include not forming residues, such as carbon emission, and re-introducing the oxygen consumed during the combustion process and recovered by means of the photodissociation process into the atmosphere or reusing it.

The invention claimed is:

1. An exhaust gas purification device of an internal combustion engine, comprising:
   a) a vapor separation module, comprising:
   a cylindrical container with vertical rotation axis and having a lower part and an upper part, said vapor separation module having an inlet for introducing exhaust gas located in the lower part and provided with a fluid-tight valve;

a cover which closes an upper end of said cylindrical container, an outlet being located on said cover for the exhaust gas treated in said vapor separation module;

separation means for retaining water vapor and solid particles from the exhaust gas, wherein the separation means comprise filtering means in form of a cooling liquid contained in the lower part of the cylindrical container, said cooling liquid being apt to be crossed by the exhaust gas so that it cools and releases any particles present in suspension in said exhaust gas into said lower part, and a series of partitions where the exhaust gas surrenders the water vapor present in said gas through condensation by coming into contact with a surface of said series of partitions, whereby the vapor separation module is configured to remove water vapor and solid particles from said exhaust gas, thus obtaining dried gas which is dried and free from solid suspensions;

b) an intake module comprising:

an inlet connected to the outlet of the vapor separation module, a radial blade fan with vertical rotation axis, an outlet, the intake module being configured to aspirate the dried gas through the inlet and expel it through the outlet;

c) a dissociation module consisting of a photodissociation cell, said photodissociation cell being provided with an opening connected to the outlet of said intake module for introducing the dried gas, and with an opening for releasing the gas resulting from the photodissociation, the photodissociation cell comprising:

a first electrode which acts as an anode, formed by a plurality of filiform antennas, a second electrode, consisting of a wall of the photodissociation cell, a pulse generator connected to the first electrode and to the second electrode, the photodissociation cell being configured to generate ultraviolet rays by applying a unidirectional pulsating electric field to the first electrode and the second electrode by means of the pulse generator, whereby the dried gas is subjected in the dissociation module to a photodissociation process by means of which carbon dioxide contained in said dried gas is split into its components.

2. The exhaust gas purification device according to claim 1, wherein the outlet of said photodissociation cell is connected to the internal combustion engine so that at least one part of gas exiting from the dissociation module can be reintroduced into the internal combustion engine to be reused in a combustion process.

3. The exhaust gas purification device according to claim 1, wherein said plurality of filiform antennas is arranged in middle of the photodissociation cell.

4. The exhaust gas purification device according to claim 1, wherein said pulse generator is configured to produce a unidirectional pulsating high voltage of value lower than that needed to generate a discharge in the gas.

5. A method for purifying exhaust gases released by an internal combustion engine provided with an exhaust gas purification device according to claim 1, such a method comprising the following steps:

a) introducing exhaust gases into the vapor separation module, b) separating the aqueous vapor contained in the exhaust gas by means of condensation, c) eliminating corpuscular residue present in the exhaust gas by using said separation means, d) aspirating the dried exhaust gas which is free from corpuscular impurities and introducing said gas into the photodissociation cell for treating it with ultraviolet rays.

6. The method according to claim 5, wherein the exhaust gas thus treated is re-introduced into the internal combustion engine.

7. The method according to claim 5, wherein the ultraviolet rays are produced by applying a unidirectional pulsated electric field of great amplitude, but insufficient to produce a discharge in said gas.

* * * * *